United States Patent [19]

Wyness

[11] 4,146,471

[45] Mar. 27, 1979

[54] LIQUID CLARIFICATION APPARATUS AND METHOD

[76] Inventor: David K. Wyness, 1624 Willemoore, Springfield, Ill. 62704

[21] Appl. No.: 749,474

[22] Filed: Dec. 10, 1976

Related U.S. Application Data

[63] Continuation-in-part of Ser. No. 597,683, Jul. 21, 1975, abandoned, which is a continuation of Ser. No. 420,272, Nov. 29, 1973, abandoned.

[51] Int. Cl.² ............................................ B01D 21/08
[52] U.S. Cl. ........................................ 210/20; 210/46; 210/207; 210/220
[58] Field of Search ......... 210/20, 42 R, 49, 207–209, 210/220, 46

[56] References Cited

U.S. PATENT DOCUMENTS

| | | | |
|---|---|---|---|
| 2,347,318 | 4/1944 | Gurney | 210/20 |
| 2,355,069 | 8/1944 | Green | 210/46 |
| 2,366,898 | 1/1945 | Gurney | 210/208 |
| 2,368,354 | 1/1945 | Green | 210/20 |
| 2,377,545 | 6/1945 | Felsecker | 210/208 |
| 2,721,173 | 10/1955 | Lawlor | 210/208 |

*Primary Examiner*—Thomas G. Wyse
*Attorney, Agent, or Firm*—Merriam, Marshall & Bicknell

[57] ABSTRACT

A method of and apparatus for treating a liquid containing contaminating solid or dissolved solid materials comprising introducing the liquid into a treatment vessel in the lower part of a generally-conical interior portion thereof, causing said liquid to move upwardly with helical flow through said generally-conical interior portion toward said upper end thereof, the path of said helical flow gradually widening as it progresses upwardly through said generally-conical interior portion thereby resulting in separation of solids from the liquid, gradually decreasing the velocity of said liquid by the gradual widening of said helical flow path as it progresses upwardly to form a rotating sludge blanket of separated solids in the upper part of said generally-conical interior portion above the point of liquid introduction, passing the liquid upwardly through said rotating sludge blanket to clarify said liquid while said liquid is moving along said helical flow path, removing the clarified liquid from said treatment vessel at a location above the level of said rotating sludge blanket, maintaining a central quiescent zone in said treatment vessel at about the mouth of a sludge removal downcomer located at about the position of said rotating sludge blanket, and withdrawing sludge from the rotating sludge blanket through the downcomer mouth.

37 Claims, 4 Drawing Figures

FIG.4

LIQUID CLARIFICATION APPARATUS AND METHOD

This application is a continuation-in-part of my copending application Ser. No. 597,683 filed July 21, 1975 and which application is a continuation of my application Ser. No. 420,272 filed Nov. 29, 1973, both now abandoned.

The invention relates to apparatus and methods of treating liquids to remove solids therefrom, such as in the treating of water to clarify it for potable or industrial use.

The invention provides apparatus for purifying a liquid containing suspended or dissolved solid materials which comprises a vessel having an upper end and a lower end with a substantially conical portion having a large diameter at the upper end and a small diameter at the lower end, an inlet for a contaminated liquid at the vessel lower end, means for causing a contaminated liquid, fed by the inlet to the vessel lower end, to flow in a helical path upwardly in the conical portion whereby the solids agglomerate and separate in a sludge gathering zone in the large diameter conical portion as a revolving sludge blanket layer below but near the upper end of the vessel with clarified purified liquid above the sludge blanket, an outlet for clarified purified liquid at the vessel upper end above the sludge gathering zone, and a downcomer means having a horizontal mouth axially located at about or below the position of said rotating sludge blanket in the large diameter conical portion in the sludge gathering zone for removing sludge from the vessel as it accumulates in the sludge blanket, with said downcomer extending out of the vessel. The sludge blanket may be initially set at a level above the downcomer mouth and by adjusting the sludge blanket withdrawal rate, the blanket level can be maintained so that equilibrium of the blanket is established.

The solids which are separated have a density higher than the liquid from which they are removed. The sludge blanket is thus suspended by the helical flow of liquid. Without such supporting force the sludge blanket solids would settle downwardly in the vessel.

The invention also provides a method of treating a liquid containing suspended or dissolved solid material. In the method the liquid is introduced into a treatment vessel in the lower part of a generally-conical interior portion thereof, the liquid is caused to move upwardly with helical flow through said generally-conical interior portion toward said upper end thereof, the path of said helical flow is gradually widened as the liquid progresses upwardly through said generally-conical interior portion thereby resulting in separation of solids from the liquid, the velocity of said liquid is gradually decreased by the gradual widening of said helical flow path as the liquid progresses upwardly to form a rotating sludge blanket of separated solids in the upper part of said generally-conical interior portion above the point of liquid introduction into the vessel, the liquid is passed upwardly through said rotating sludge blanket to clarify said liquid while said liquid is moved along said helical flow path, the clarified liquid is removed from said treatment vessel at a location above the level of said rotating sludge blanket, a central quiescent zone is maintained in said treatment vessel at about the mouth of a sludge removal downcomer located at about or below the position of said rotating sludge blanket, and sludge from the rotating sludge blanket is withdrawn through the downcomer mouth.

The liquid to be treated can have the solids initially dispersed or suspended in the liquid or the solids can be in solution initially and be caused to precipitate out before or during practice of the method or use of the apparatus. Any suitable chemical can be used to precipitate the solids if dissolved and, furthermore, a chemical additive can also be employed to promote agglomeration or flocculation of solids initially suspended or dispersed in the liquid.

Chemicals of the type which will precipitate and flocculate dissolved and/or suspended solid materials from water can be used in the invention to purify water. Chemicals of this type include such well known treating chemicals as line, soda ash, aluminum sulfate, ferric sulfate, or ferrous sulfate which, when mixed together in aqueous solution, form feathery solid structures in the water. The chemicals coagulate or precipitate and then coalesce the suspended and/or precipitated materials in the water, ultimately forming flocculated solids which, on becoming quiescent, settle out of the treated water and also remove with it suspended materials.

The subsequent discussion of the invention will be directed primarily to its use in the clarification and purification of water. However, the invention is not thereby to be limited to the treatment of this specific liquid since other liquids may be treated similarly using the method and apparatus of the invention.

The present invention provides a method and apparatus for economically treating water containing dissolved and/or suspended solid materials, to coagulate, flocculate and precipitate the dissolved and/or suspended materials from the water. The method provides a flow path for the water and reactant chemicals if added which is long enough to allow the chemicals to react with impurities in the water and to form a floc which agglomerates the suspended and/or precipitated solid materials being removed from the water. That long flow path allows adequate time for the floc to coalesce into large agglomerates which will separate from the treated water and bear with them the solid matter. This is accomplished without expensive power-consuming recycling and/or mixing of the water and chemicals. The present method also provides greater flexibility in the treatment method and in the apparatus in which the method is performed.

The water to be treated is passed through a rotating sludge blanket to provide enough contact between the water and sufficiently large agglomerates of the flocculating chemicals to remove the suspended and/or precipitated solid materials, thereby filtering and clarifying the treated water before it is removed from the apparatus. Adjustability or controlability of the process is provided, without the use of power-consuming pumping, mixing and recycling, by using the energy which is present in the water as it flows into the apparatus, and by changing the relative components of velocity during the process to provide adequate vertical, circumferential, and turbulent flow to properly suspend the flocculated material. The water and treating chemicals in the process are caused to follow a generally helical path throughout the apparatus. Baffles may be placed at selected locations along the flow path, which are adjustable and which may be positioned to control and adjust the relative circumferential components of the flow along the generally helical path. The volumetric flow rate is gradually decreased along the flow path so that ultimately the velocity becomes sufficiently low to enable the flocculated material to reach a point where it is in equilibrium suspension and thus does not rise further in the apparatus. The suspension of flocculated material tends to remain fixed at a sludge gathering zone at one level of the conical portion upper end and to form a rotating sludge blanket or sludge layer.

A quiescent zone is maintained just beneath the upper level of the rotating sludge layer in the sludge gathering zone so that the heavy agglomerated particles can move into the quiescent zone and then be removed from the apparatus. By using adjustable baffles, the circumferential velocity of the rotating sludge blanket can be adjusted or maintained over a wide variety of net flow rates, as by changing the velocity components of the flow. The effluent water will continue to flow upwardly through the rotating sludge blanket and will be drawn off by suitable collection means, such as an overflow weir. That effluent water will be removed from the apparatus in a greatly clarified and purified state as a result of having the suspended matter removed by the chemical action and by filtration through the rotating sludge blanket.

DESCRIPTION OF THE PREFERRED EMBODIMENT

Figures 1, 2, 3:
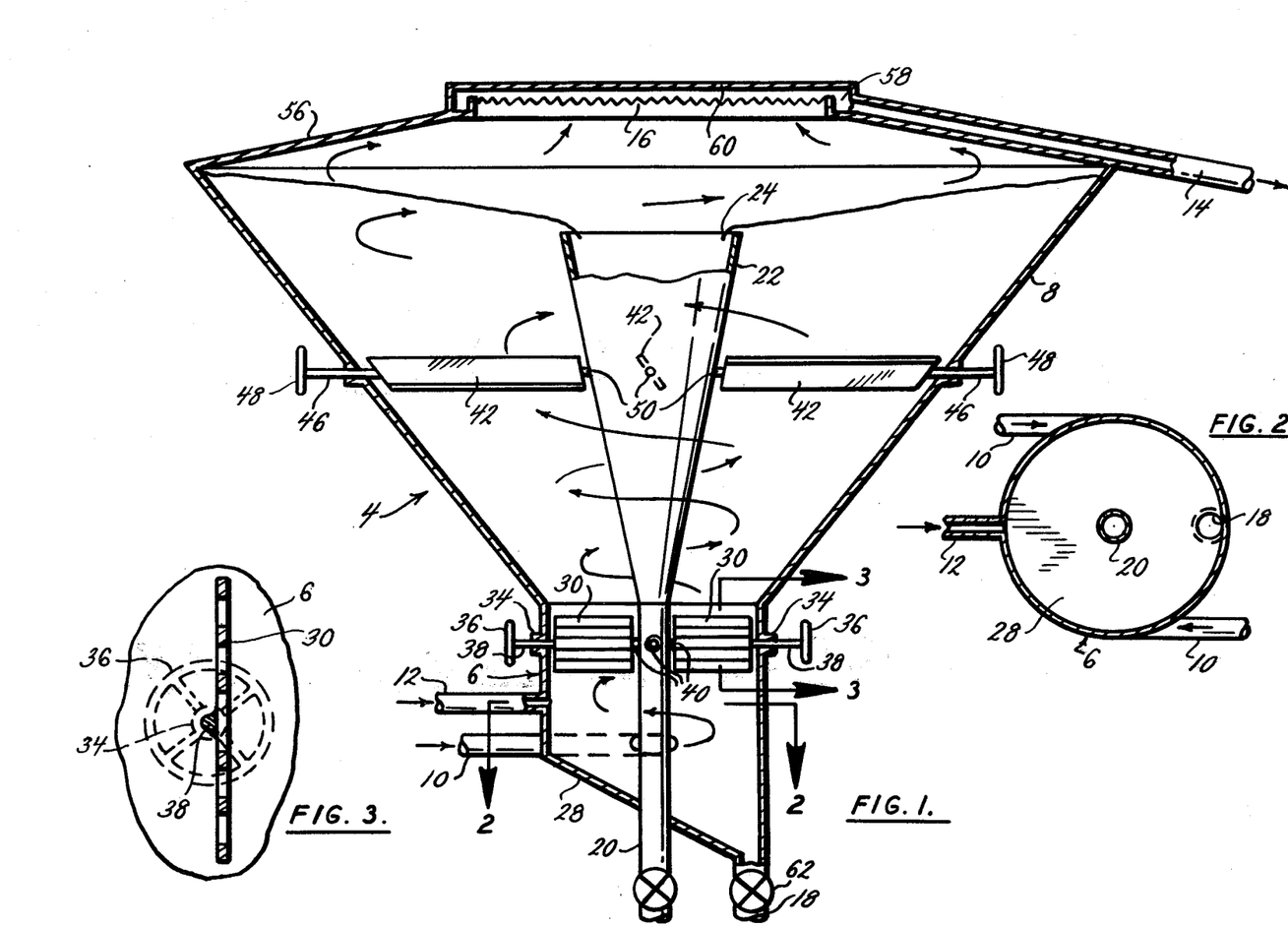
FIG. 1 is a cross-sectional view of an apparatus for performing applicant's process showing tangential inlets for the liquid, such as water, to be treated, conical sides, adjustable baffles and a central quiescent zone.
FIG. 2 is a transverse cross-sectional view of the lower portion of the apparatus of FIG. 1 taken along the plane indicated by the lines 2—2 showing the cylindrical inlet chamber and tangential inlets.
FIG. 3 is a partial cross-sectional view of the adjustable baffles taken along the plane indicated by the lines 3—3 of FIG. 1.

Referring in more detail to the drawings, in FIG. 1 a vessel 4 is shown having walls 8 formed in the shape of a frustum of a cone with the minimum diameter located at the bottom and with the maximum diameter located near the top. Attached to the lower extremity of the cone is a cylindrical inlet chamber 6 having tangential inlets 10 for water and one or more inlets 12 for water-treating chemicals. The inlet 12 is preferably located so the entering chemicals flow across the path of water entering through inlets 10 to insure adequate mixing of the chemicals and of the water to be treated. The cylindrical inlet chamber 6 has a sloping bottom 28 provided with an outlet 18 and a valve 62 so any accumulation of sludge or heavy materials may be removed, and so the equipment can easily be cleaned during down periods. Placed in the cylindrical inlet chamber 6 are a plurality of baffles 30 that are mounted on shafts 38 which extend through bearings 34 in the wall of that cylindrical inlet chamber and that are adjustably controlled by handles 36. The inner extremities of the shafts 38 are mounted in bearings 40 on vertical outlet pipe 20, which is located centrally of the cylindrical inlet chamber 6. Vertical pipe 20 extends upwardly through the cylindrical inlet chamber 6 and attaches to central vertical downcomer 22 which extends upwardly and centrally in the vessel 4 to a location near the maximum diameter portion. Spaced at an intermediate location between the top of downcomer 22 and the minimum cross-section area of the cone are a plurality of supplemental baffles 42 mounted through the wall 8 of vessel 4 and attached to downcomer 22 at bearings 50. Handles 48 are provided on the shafts 46 for adjustable movement of the baffles. Spaced above the maximum cross-sectional area of the cone and supported thereby is a cover which can be made of an annular inwardly-extending plate 56 and a central top 60. The top 60 may be left off for observation purposes. Mounted on the edge of the plate 56 is an annular collection zone 58 separated from the interior of the vessel by a trough means, such as weir 16. Outlet 14 communicates with the annular collection zone 58 for removing effluent water from the vessel.

In operation, water to be clarified enters cylindrical inlet chamber 6 through tangentially located inlets 10. The tangential inlets impart a generally helical motion to the water entering the vessel, shown by the arrows in FIG. 1 to be a left-handed helical motion. The helical motion imparted to the inlet water causes the water to flow in a generally helical path from the inlet through the vessel vertically until it passes into a trough means, such as weir 16, and out through outlet 14.

Treating chemicals, such as ferrous sulfate, aluminum sulfate, or other conventional chemicals, may be added through chemical inlet 12, which is arranged so the flow of chemicals into the mixing chamber is not parallel to the flow of water, thus promoting mixing of the chemicals with the inlet water. On being introduced into the chamber, the chemicals react with the inlet water to form a floc which precipitates and flocculates the dissolved and/or suspended solid materials in the water. The mixture of water and chemicals rises and contacts baffles 30 which promote and increase additional mixing. The primary function of baffles 30, however, is to control the horizontal and vertical velocity vectors of the stream of water in the tank.

The mixed water and chemicals rise in a generally helical path out of cylindrical inlet chamber 6 into the conical section of the vessel. As the mixture rises through the conical portion of the vessel, the cross-sectional area of the vessel increases, resulting in a corresponding decrease in the space flow rate of the treated water through the vessel, although the net flow rate remains constant. The admixed inlet water and treating chemicals will contact the baffles 42 which provide a secondary control of the velocity vectors of the mixture as it rises in the conical portion of the vessel 4. The helical path of motion imparted to the water and chemicals and the decreasing space flow rate increase the contact time of the water and chemicals over that of a straight flow-through system by lengthening the path of travel. Increased contact time allows adequate time for the chemicals to adequately react with, precipitate, coagulate and flocculate the contaminating solid materials present in the liquid. As the space flow rate decreases, the vertical velocity of the water decreases until the flocs which are formed are no longer carried by the drag or lift and turbulence of the water, and a point of equilibrium is reached where the lifting force of the water and the counteracting gravitational force on the precipitates and/or flocculated particles is in equilibrium, causing a suspended rotating sludge blanket of the precipitated and/or flocculated materials to form in the vessel. The rotating sludge blanket is suspended at or below the maximum diameter of the vessel.

The treated water, of course, continues to flow vertically through the rotating sludge blanket, leaving the suspended matter behind in the rotating sludge layer. The treated water flows over a trough means, such as weir 16, into annular collecting chamber 58 and out through outlet 14 as clarified effluent water. Treatment chemicals and flocculated particles continue to react and to collect solid matter from the water flowing through the rotating sludge blanket, thereby causing floc growth, until they ultimately move into the central quiescent zone 24 and are removed through the mouth of the central vertical downcomer 22.

Baffles 30, in addition to increasing the mixing of the inlet water and treating chemicals, can have the angles of inclination thereof adjusted to vary the circumferential velocity of the admixed inlet water and treating chemicals. By using the baffles 30 and 42 to adjust the circumferential and vertical components of the velocity of the mixture of water and chemicals, the rotating sludge blanket can be maintained in suspension. Flexibility in the device is thus provided without incurring excessive pumping costs necessitated by extensive internal recycling of the mixture of water and chemicals. A normal range of operating conditions for the device is a tangential velocity of from 300 inches per minute to preferably between about 1,000 to 3,000 inches per minute at the inlet 10. At the exit from chamber 6 and entrance into the conical section of the vessel 4 the vertical velocity component is from about 6 inches per minute to preferably about 20 to 100 inches per minute, and the circumferential velocity component is from about 1,000 to 3,000 inches per minute. At the maximum diameter of the cone the vertical velocity component is from about 0.1 to 6 inches per minute and the circumferential velocity component is advisably between about 1 to 100 inches per minute, although 10 to 200 inches per minute may be suitable.

In the rotating sludge blanket, the rotational forces imparted to the water and chemicals in the generally helical path tend to push the heavier particles and flocculated material generally outwardly toward the periphery of the vessel. However, by removing the particles in a central quiescent zone, the present invention causes the floc to tend to flow towards the center of the vessel. The overall result is the development and maintenance of a uniform rotating sludge blanket. A uniform rotating sludge blanket provides uniform filtration and clarification of the water which passes upwardly through the rotating sludge blanket.

The conical sides 8 of vessel 4 are preferably inclined at an angle between about 40 to 60 degrees from the horizontal to provide the proper rate of decrease in the space flow rate of the mixture through the vessel and to prevent settling of sludge on the sides of that vessel. The cone portion of the vessel may increase from a minimum diameter to a maximum diameter which is approximately 4 to 6 times as great as the minimum diameter. The baffles 30 and 42 may be of a variety of conventional designs, either flat plates, perforated flat plates as shown in FIG. 3; and they can be formed by a number of conventional techniques, such as stamping, cutting, or welding.

The baffles 42 may in some operations be eliminated. Similarly, the baffles 30 may also be eliminated if the flow rate of the liquid feed can be regulated satisfactorily.

Figure 4:
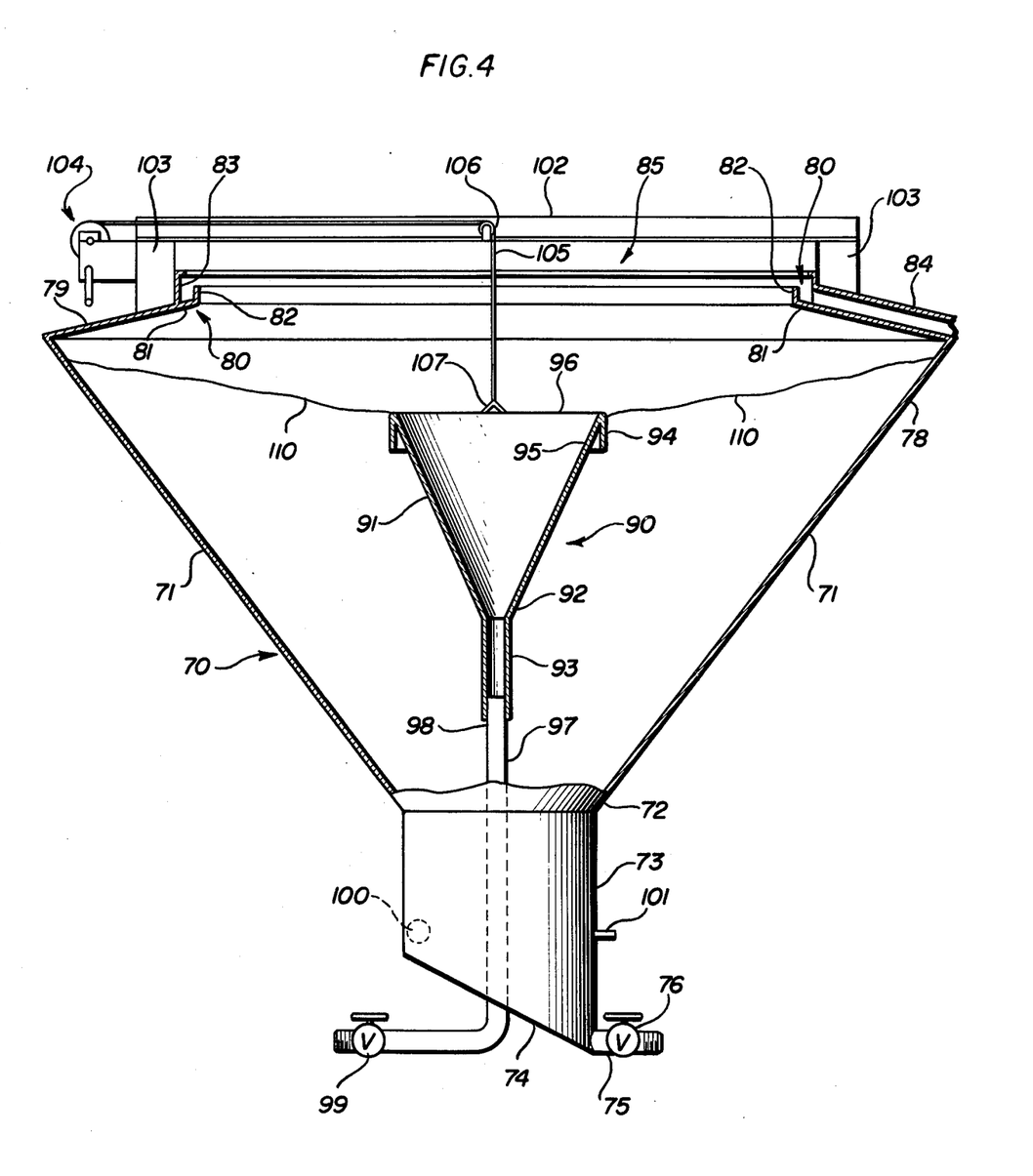
FIG. 4 is an elevational view, partially in section, of a second embodiment of the invention.

FIG. 4 of the drawings illustrates further aspects of the invention. Vessel 70 has a conical portion 71 with its lower end 72 of minimum diameter joined to the upper end of cylindrical inlet chamber 73. Chamber 73 has a sloping bottom 74 with a conduit outlet 75 at the lowest end thereof for draining the chamber 73 and to remove heavy solids such as sand, stones and the like when valve 76 is opened.

The upper end 78 of maximum diameter of conical portion 71 is joined to the outer edge of a sloped inwardly directed annular plate 79. The inner edge of plate 79 supports a trough means 80 having a flat or relatively flat bottom 81, inner vertical wall 82 and an outer vertical wall 83. Trough means 80 may be left uncovered or open for direct observation of liquid flow. Clear effluent outlet conduit or pipe 84 communicates with the trough means 80 to drain liquid which flows into it over the top of an adjustable weir plate (not shown) attached to wall 82. Obviously, a series of holes could be placed in wall 82 to drain the water into the trough from which it could then flow to pipe 84. The area 85 surrounded by the trough means 80 is left uncovered or open so that direct observation of the vessel 70 interior may be made.

Inside of vessel 70 is vertically axially positioned a downcomer 90. The downcomer 90 has an upper conical portion 91 which is joined at its lower end 92 of minimum diameter to a vertically positioned and axially located pipe or conduit 93. A substantially vertical circular flange 94 may be joined at its upper end to the upper end 95 of maximum diameter of conical portion 91. This flange serves to minimize floc carry-over into the clarified liquid zone.

Pipe 97 is vertically and axially positioned in vessel 70 and constitutes part of downcomer 90. It has an upper end 98 which telescopes into pipe 93. The pipe 97 extends downwardly through chamber 73, out bottom 74 and then curves horizontally. Valve 99 is used to open and close pipe 98. Liquid is fed by inlet 100 to chamber 73 in the same way as described with respect to the embodiment shown in FIGS. 1 to 3. Nipple 101 is provided for feeding a chemical solution to chamber 73. Baffles, not shown, are positioned in chamber 73 as previously described with reference to FIGS. 1 to 3. However, no baffles are included in the conical portion 71 since they are not always needed there.

Beam 102, generally part of a personnel access bridge, extends about diametrically across the open top of vessel 70 and is supported at each end by a post 103 which rests on plate 79. Winch 104 is mounted at one end of beam 102 and has cable 105 connected thereto. Cable 105 extends over pulley 106 and downwardly to a connection with horizontal bar 107 which is joined at its ends to the top edge of conical portion 91.

The conical portion 91 of the downcomer can be raised by means of cable 105 and winch 104 to thereby locate downcomer mouth 96 at a position most suitable for sludge from rotating blanket 110 to flow into it. Because the pipe 93 at the lower end of the conical portion 91 telescopes over the end 98 of pipe 97, vertical displacement of the downcomer mouth does not interfere with continual conduit communication with pipe 97 and the outside of the vessel for sludge removal on an intermittent or continual basis.

In large size apparatus, the mechanism for raising and lowering conical portion 91 may be supported independently of vessel 70. Also, instead of a cable-winch mechanism, it is within the scope of the invention to use hydraulic means or a motor driven system. Regardless of the system it may be manually or automatically operated.

The operation of the embodiment of the invention shown in FIG. 4 is essentially the same as for the embodiment illustrated in FIGS. 1 to 3. The telescoping downcomer of the embodiment shown in FIG. 4, however, makes it possible to obtain optimum control on liquid clarification and purification because it introduces an operating variable adjustable as needed to better correlate supply inlet rate with different solids content to obtain the desired clarified effluent.

Depending on the amount of solids in the liquid to be clarified it is possible to continually withdraw sludge out of the downcomer by leaving valve 99 open at all times during operation. However, if the solids content of the feed stream is low, valve 99 may be maintained closed and solids accumulated in the downcomer until it is about full, thereby thickening the sludge. At this time valve 99 can be opened to empty the downcomer of sludge solids. Valve 99 can then be closed and the downcomer filled again before it is once more emptied.

The ability to allow sludge to accumulate in the downcomer and internal sludge cone promotes the compaction and thickening of the sludge, thereby minimizing the problem of sludge disposal.

The two embodiments of the invention shown in the drawings have a full cover (FIGS. 1 to 3) or a partial cover or top (FIG. 4). It is within the scope of the invention to leave the vessel 70 completely uncovered and to locate a trough means 80 at the upper end 78 of the conical portion 71.

While the above specific description of the invention describes the use of chemicals to facilitate solids separation it should be understood that chemical additives are not essential in treating all liquids containing suspended or dispersed solids. Such liquids can, in some instances, be fed to and through the apparatus without any chemical treatment to facilitate removal of solids.

As described above, the present invention can be carried out without using power-consuming back mixing or recirculation of material in the process over a wide range of flow rates. It will be appreciated that one skilled in the art could modify the process without departing from the spirit of the invention disclosed. Applicant's invention is to be limited only by the scope of the invention defined by the attached claims.

What is claimed is:

1. Apparatus for purifying a liquid containing solids which comprises:
    a vessel with a conical portion having an upper end of maximum diameter and a bottom end of minimum diameter,
    a cylindrical chamber closed by a bottom at the lower end and joined at the top to the conical portion bottom end,
    a conduit means for feeding a liquid containing solids tangentially to the cylindrical chamber interior so tha the liquid flows in a helical path upwardly through the chamber into and upwardly in the conical portion whereby the solids in the liquid separate in a sludge gathering zone in the conical portion upper end as a revolving sludge blanket layer with clarified purified liquid above the sludge blanket,
    an outlet for clarified purified liquid in the vessel above the sludge gathering zone, and
    a downcomer means in the vessel having a sludge inlet mouth axial to the conical portion and located in the sludge gathering zone for removing sludge from the vessel through the downcomer as it accumulates in the sludge blanket, with said downcomer extending out of the vessel.

2. A vessel according to claim 1 in which the cylindrical chamber has an outlet for removing heavy solids.

3. A vessel according to claim 1 including means to vertically adjust the position of the downcomer mouth.

4. A vessel according to claim 1 in which adjustable baffles are positioned in the cylindrical chamber above the liquid feed conduit means to regulate the liquid flow directional components.

5. Apparatus according to claim 4 in which the baffles are rotatable about a horizontal axis from outside of the chamber.

6. Apparatus according to claim 1 in which adjustable baffles are positioned in the conical portion substantially below the sludge gathering zone to regulate the liquid flow directional components.

7. Apparatus according to claim 6 in which the baffles are rotatable about a horizontal axis from outside of the conical portion.

8. Apparatus according to claim 1 in which the downcomer is a vertical conduit which extends axially downwardly through the conical portion and the cylindrical chamber and extends out the chamber.

9. Apparatus according to claim 8 in which the downcomer upper portion is conical with the largest diameter at the sludge inlet mouth.

10. Apparatus according to claim 1 in which a chemical supply conduit means communicates with the cylindrical chamber.

11. Apparatus according to claim 1 in which a cover is supported by the conical portion upper end, the cover has a trough means for collecting clarified purified liquid, and the outlet for the clarified purified liquid communicates with the trough means.

12. Apparatus for purifying a liquid containing solids which comprises:
    a vessel with a conical portion having an upper end maximum diameter and a bottom end minimum diameter,
    a cylindrical chamber closed by a bottom at the lower end and joined at the top to the conical portion bottom end,
    a conduit means for feeding a liquid containing solids tangentially to the cylindrical chamber interior so that the liquid flows in a helical path upwardly through the chamber into and upwardly in the conical portion whereby the solids in the liquid separate in a sludge gathering zone in the conical portion upper end as a revolving sludge blanket layer with clarified purified liquid above the sludge blanket,
    an outlet for clarified purified liquid in the vessel above the sludge gathering zone,
    a downcomer vertical conduit in the vessel having a sludge inlet mouth axial to the conical portion and located in the sludge gathering zone for removing sludge from the container through the downcomer as it accumulates in the sludge blanket, with said downcomer extending axially downwardly through the conical portion and the cylindrical chamber and out the chamber, and
    adjustable baffles positioned at least in the cylindrical chamber above the liquid feed conduit means, or in the conical portion substantially below the sludge gathering zone, to regulate the liquid flow directional components.

13. Apparatus according to claim 12 in which a chemical supply conduit means communicates with the vessel lower end.

14. Apparatus for purifying a liquid containing contaminating solids which comprises:
   a vessel having an upper end and a lower end with a substantially conical portion having a large diameter at the upper end and a small diameter at the lower end,
   an inlet for a contaminated liquid at the vessel lower end,
   means for causing a contaminated liquid, fed by the inlet to the lower end, to flow in a helical path upwardly in the conical portion whereby the solids agglomerate and separate in a sludge gathering zone in the large diameter conical portion as a revolving sludge blanket layer below but near the upper end of the vessel with clarified purified liquid above the sludge blanket,
   an outlet for clarified purified liquid at the vessel upper end above the sludge gathering zone, and
   a downcomer means having a horizontal mouth axially located in the large diameter conical portion in the sludge gathering zone for removing sludge from the vessel as it accumulates in the sludge blanket, with said downcomer extending out of the vessel.

15. A vessel according to claim 14 including means to vertically adjust the position of the downcomer mouth.

16. Apparatus according to claim 14 in which adjustable baffles are positioned in a lower portion of the vessel to regulate the liquid flow directional components.

17. Apparatus according to claim 16 in which the baffles are rotatable from outside of the vessel.

18. Apparatus according to claim 14 in which the downcomer is a vertical conduit which extends axially downwardly through the conical portion and out of the vessel.

19. Apparatus according to claim 18 in which the downcomer upper portion is conical with the largest diameter at the sludge inlet mouth.

20. Apparatus according to claim 14 in which a cover is supported by the conical portion upper end, the cover has a trough means for collecting clarified purified liquid, and the outlet for the clarified purified liquid communicates with the trough means.

21. A method of treating a liquid containing solid material comprising:
   introducing the liquid into a treatment vessel in the lower part of a generally-conical interior portion thereof,
   causing said liquid to move upwardly with helical flow through said generally-conical interior portion toward said upper end thereof,
   the path of said helical flow gradually widening as it progresses upwardly through said generally-conical interior portion thereby resulting in separation of solids from the liquid,
   gradually decreasing the velocity of said liquid by the gradual widening of said helical flow path as it progresses upwardly to form a rotating sludge blanket of separated solids in the upper part of said generally-conical interior portion above the point of liquid introduction,
   passing the liquid upwardly through said rotating sludge blanket to clarify said liquid while said liquid is moving along said helical flow path,
   removing the clarified liquid from said treatment vessel at a location above the level of said rotating sludge blanket,
   maintaining a central quiescent zone in said treatment vessel at about the mouth of a sludge removal downcomer located at about the position of said rotating sludge blanket, and
   withdrawing sludge from the rotating sludge blanket through the downcomer mouth.

22. A method according to claim 21 in which the velocity of the helically and upwardly flowing liquid is regulated by baffles in the vessel adjustable from outside of the vessel.

23. A method according to claim 21 in which the liquid is water and a chemical is added to the water in a bottom portion of the vessel to precipitate dissolved solids and/or to flocculate suspended materials in the water.

24. A method according to claim 21 in which the downcomer is a vertical conduit which extends axially downwardly through the conical interior portion and to the outside of the vessel, and the liquid flows helically around the downcomer conduit.

25. A method according to claim 21 including adjusting vertically the position of the downcomer mouth to place it at the optimum location relative to the sludge blanket.

26. Apparatus for purifying a liquid containing solids which comprises:
   a vessel with a conical portion having an upper end of maximum diameter and a bottom end of minimum diameter and sides inclined at an angle of about 40 to 60 degrees from the horizontal,
   a cylindrical chamber closed by a bottom at the lower end and joined at the top to the conical portion bottom end, said cylindrical chamber having an outlet for removing heavy solids,
   a conduit means for feeding a liquid containing solids tangentially to the cylindrical chamber interior so that the liquid flows in a helical path upwardly through the chamber into and upwardly in the conical portion whereby the solids in the liquid separate in a sludge gathering zone in the conical portion upper end as a revolving sludge blanket layer with clarified purified liquid above the sludge blanket,
   adjustable baffles, positioned in the conical portion substantially below the sludge gathering zone, and rotatable about a horizontal axis from outside of the conical portion, to regulate the liquid flow directional components,
   adjustable baffles, positioned in the cylindrical chamber above the liquid feed conduit means, rotatable about a horizontal axis from outside of the chamber, to regulate the liquid flow directional components,
   a cover supported by the conical portion upper end, said cover having a trough means for collecting clarified purified liquid above the sludge gathering zone,
   an outlet for the clarified purified liquid in communication with the trough means,
   a downcomer vertical conduit which extends axially downwardly through the conical portion and the cylindrical chamber and extends out the chamber,
   the downcomer having a sludge inlet mouth axial to the conical portion and located in the sludge gathering zone for removing sludge from the vessel through the downcomer as it accumulates in the sludge blanket, the downcomer upper portion being conical with the largest diameter at the sludge inlet mouth, means to vertically adjust the position of the downcomer mouth, and a chemical supply conduit means on communication with the cylindrical chamber.

27. A method of treating water containing solid material comprising:

introducing water into a treatment vessel in the lower part of a generally conical interior portion thereof having sides inclined at an angle of about 40 to 60 degrees from the horizontal, adding a chemical to the water in a bottom portion of the vessel to precipitate dissolved solids and/or to flocculate suspended materials in the water, causing said water to move upwardly with helical flow through said generally-conical interior portion toward the upper end thereof, regulating the velocity of the helically and upwardly flowing water by baffles in the vessel adjustable from outside of the vessel, the path of said helical flow gradually widening as it progresses upwardly through said generally-conical interior portion thereby resulting in separation of solids from the water, gradually decreasing the velocity of said water by the gradual widening of said helical flow path as it progresses upwardly to form a rotating sludge blanket of separated solids in the upper part of said generally-conical interior portion above the point of water introduction, passing the water upwardly through said rotating sludge blanket to clarify said water while said water is moving along said helical flow path, removing the clarified water from said treatment vessel at a location above the level of said rotating sludge blanket, maintaining a central quiescent zone in said treatment vessel at about the mouth of a sludge removal downcomer located at about the position of said rotating sludge blanket, said downcomer being a vertical conduit which extends axially downwardly through the conical interior portion and to the outside of the vessel, and the water flows helically around the downcomer conduit, adjusting vertically the position of the downcomer mouth to place it at the optimum location relative to the sludge blanket, and withdrawing sludge from the rotating sludge blanket through the downcomer mouth.

28. Apparatus for purifying a liquid containing solids which comprises:

a vessel with a conical portion having an upper end of maximum diameter and a bottom end of minimum diameter and sides inclined at an angle of about 40 to 60 degrees from the horizontal, a cylindrical chamber closed by a bottom at the lower end and joined at the top to the conical portion bottom end, a conduit means for feeding a liquid containing solids tangentially to the cylindrical chamber interior so that the liquid flows in a helical path upwardly through the chamber into and upwardly in the conical portion whereby the solids in the liquid separate in a sludge gathering zone in the conical portion upper end as a revolving sludge blanket layer with clarified purified liquid above the sludge blanket, an outlet for clarified purified liquid in the vessel above the sludge gathering zone, and a downcomer means in the vessel having a sludge inlet mouth axial to the conical portion and located in the sludge gathering zone for removing sludge from the vessel through the downcomer as it accumulates in the sludge blanket, with said downcomer extending out of the vessel.

29. A vessel according to claim 28 in which the cylindrical chamber has an outlet for removing heavy solids.

30. A vessel according to claim 28 including means to vertically adjust the position of the downcomer mouth.

31. Apparatus according to claim 28 in which the downcomer is a vertical conduit which extends axially downwardly through the conical portion and the cylindrical chamber and extends out the chamber.

32. Apparatus according to claim 31 in which the downcomer upper portion is conical with the largest diameter at the sludge inlet mouth.

33. Apparatus for purifying a liquid containing solids which comprises:

a vessel with a conical portion having an upper end maximum diameter and a bottom end minimum diameter and sides inclined at an angle of about 40 to 60 degrees from the horizontal, a cylindrical chamber closed by a bottom at the lower end and joined at the top to the conical portion bottom end, a conduit means for feeding a liquid containing solids tangentially to the cylindrical chamber interior so that the liquid flows in a helical path upwardly through the chamber into and upwardly in the conical portion whereby the solids in the liquid separate in a sludge gathering zone in the conical portion upper end as a revolving sludge blanket layer with clarified purified liquid above the sludge blanket, an outlet for clarified purified liquid in the vessel above the sludge gathering zone, a downcomer vertical conduit in the vessel having a sludge inlet mouth axial to the conical portion and located in the sludge gathering zone for removing sludge from the container through the downcomer as it accumulates in the sludge blanket, with said downcomer extending axially downwardly through the conical portion and the cylindrical chamber and out the chamber, and adjustable baffles positioned at least in the cylindrical chamber above the liquid feed conduit means, or in the conical portion substantially below the sludge gathering zone, to regulate the liquid flow directional components.

34. Apparatus for purifying a liquid containing contaminating solids which comprises:

a vessel having an upper end and a lower end with a substantially conical portion having a large diameter at the upper end and a small diameter at the lower end and sides inclined at an angle of about 40 to 60 degrees from the horizontal, an inlet for a contaminated liquid at the vessel lower end, means for causing a contaminated liquid, fed by the inlet to the vessel lower end, to flow in a helical path upwardly in the conical portion whereby the solids agglomerate and separate in a sludge gathering zone in the large diameter conical portion as a revolving sludge blanket layer below but near the upper end of the vessel with clarified purified liquid above the sludge blanket, an outlet for clarified purified liquid at the vessel upper end above the sludge gathering zone, and a downcomer means having a horizontal mouth axially located in the large diameter conical portion in the sludge gathering zone for removing sludge from the vessel as it accumulates in the sludge blanket, with said downcomer extending out of the vessel.

35. A vessel according to claim 34 including means to vertically adjust the position of the downcomer mouth.

36. Apparatus according to claim 34 in which the downcomer is a vertical conduit which extends axially downwardly through the conical portion and out of the vessel.

37. Apparatus according to claim 36 in which the downcomer upper portion is conical with the largest diameter at the sludge inlet mouth.

* * * * *

UNITED STATES PATENT AND TRADEMARK OFFICE
CERTIFICATE OF CORRECTION

PATENT NO. : 4,146,471
DATED : March 27, 1979
INVENTOR(S) : DAVID KEITH WYNESS

It is certified that error appears in the above-identified patent and that said Letters Patent are hereby corrected as shown below:

Column 2, line 16, change "line" to -- lime --;

column 8, lines 3, 5 and 7, column 9, line 28, column 12, lines 12 and 14 and column 14, line 3, change "A vessel" to -- Apparatus --;

column 9, line 15, change "gatherine" to

-- gathering --; column 11, line 7, change "on"

to -- in --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks